United States Patent
Suzuki et al.

(10) Patent No.: US 11,610,698 B2
(45) Date of Patent: Mar. 21, 2023

(54) ELECTRIC WIRE, CABLE, AND MANUFACTURING METHOD OF ELECTRIC WIRE

(71) Applicant: Hitachi Metals, Ltd., Tokyo (JP)

(72) Inventors: Hideyuki Suzuki, Tokyo (JP); Katsuya Iikai, Tokyo (JP); Takuya Oriuchi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 371 days.

(21) Appl. No.: 16/891,907

(22) Filed: Jun. 3, 2020

(65) Prior Publication Data

US 2020/0388414 A1 Dec. 10, 2020

(30) Foreign Application Priority Data

Jun. 4, 2019 (JP) .............................. JP2019-104463

(51) Int. Cl.
| | | |
|---|---|---|
| *H01B 3/44* | (2006.01) | |
| *C09D 5/00* | (2006.01) | |
| *C09D 123/06* | (2006.01) | |
| *C09D 7/65* | (2018.01) | |
| *B29C 48/06* | (2019.01) | |
| *H01B 13/06* | (2006.01) | |
| *B29C 71/04* | (2006.01) | |
| *B29K 105/00* | (2006.01) | |
| *B29K 23/00* | (2006.01) | |

(Continued)

(52) U.S. Cl.
CPC ............ *H01B 3/441* (2013.01); *B29C 48/06* (2019.02); *B29C 71/04* (2013.01); *C09D 5/00* (2013.01); *C09D 7/65* (2018.01); *C09D 123/06* (2013.01); *H01B 13/06* (2013.01); *B29K 2023/00* (2013.01); *B29K 2105/0079* (2013.01); *B29K 2105/20* (2013.01); *B29K 2705/00* (2013.01)

(58) Field of Classification Search
None
See application file for complete search history.

(56) References Cited

FOREIGN PATENT DOCUMENTS

| JP | H0528863 A | 2/1993 |
|---|---|---|
| JP | 2002133962 A | 5/2002 |

(Continued)

OTHER PUBLICATIONS

Machine-generated translation of Detailed Description of JP H0528863A, published May 1993, 4 pages; retrieved from Espacenet on Aug. 11, 2022. (Year: 1993).*

(Continued)

*Primary Examiner* — Fred M Teskin
(74) *Attorney, Agent, or Firm* — David D. Brush; Westman, Champlin & Koehler, P.A.

(57) ABSTRACT

An electrical wire includes a conductor and an insulating layer that covers the conductor and that is cross-linked. The insulating layer is a cross-linked product of a resin composition including (a) a base polymer containing polyolefin and a compatibilizer, (b) a photoradical generator of 0.5 parts by mass or more and 3 parts by mass or less relative to the 100 parts by mass of the base polymer, and (c) a reactive monomer of 1 part by mass or more and 5 parts by mass or less relative to the 100 parts by mass of the base polymer. A relative dielectric constant of the insulating layer is less than 2.5.

13 Claims, 2 Drawing Sheets

(51) Int. Cl.
    *B29K 105/20*     (2006.01)
    *B29K 705/00*     (2006.01)

(56) References Cited

FOREIGN PATENT DOCUMENTS

| | | |
|---|---|---|
| JP | 2003160702 A | 6/2003 |
| JP | 2014218067 A | 11/2014 |

OTHER PUBLICATIONS

Machine-generated translation of Detailed Description of JP 2003160702A, published Jun. 2003, 4 pages; retrieved from Espacenet on Aug. 11, 2022. (Year: 2003).*

Omnicable, Dielectric Constants of Insulations, one page, dated May 1, 2018. (Year: 2018).*

Notice of Reasons for Refusal dated Jul. 26, 2022 for corresponding Japanese Application No. 2019-104463, filed Jun. 4, 2019.

Decision of Refusal dated Oct. 4, 2022 for corresponding Japanese Application No. 2019-104463, filed Jun. 4, 2019.

\* cited by examiner

ELECTRIC WIRE, CABLE, AND MANUFACTURING METHOD OF ELECTRIC WIRE

CROSS-REFERENCE TO RELATED APPLICATIONS

This application claims the benefit of Japanese Patent Application No. 2019-104463 filed on Jun. 4, 2019 with the Japan Patent Office, and the entire disclosure of which is incorporated herein by reference.

BACKGROUND

The present disclosure relates to an electrical wire, a cable, and a method for manufacturing an electrical wire.

The electrical wire and the cable each include a conductor and an insulating layer. The insulating layer covers the conductor. In recent years, for use in electronic devices, vehicles such as automobiles, industrial robots, medical purposes and the like, in more and more cases, multiplicity of electrical wires or cables having small diameters and thin bodies are used in limited spaces.

When the electrical wire or the cable is used for data communication transmitting large-volume data or for high speed data communication, it is preferable that the insulating layer has a small relative dielectric constant in order to inhibit transmission loss and to shorten the delay of a signal.

When the resin forming the insulating layer flows due to heat, the electrical wire and the cable may be deformed and may cause a short circuit with an adjacent line. Thus, it is preferable that the resin forming the insulating layer has a high heat distortion resistance.

Examples of a resin having a small relative dielectric constant and a high heat distortion resistance may include cross-linked polyolefin. A technique for cross-linking a resin forming an insulating layer is disclosed, for example, in Japanese Unexamined Patent Application Publication No. 2002-133962.

SUMMARY

An ultraviolet cross-linking is one of the methods for cross-linking an insulating layer of an electrical wire or a cable each having a small diameter and a thin body. To perform the ultraviolet cross-linking on an insulating layer containing polyolefin, a reactive monomer and a photoradical generator need to be added to the insulating layer. The reactive monomer and the photoradical generator tend to cause bleed-out from the insulating layer containing the polyolefin. One of the methods to inhibit the bleed-out is to add a nucleating agent and/or a thickening agent, which are composed of a variety of powders, to the insulating layer. However, the addition of the nucleating agent and/or the thickening agent may increase the relative dielectric constant of the insulating layer.

Therefore, it has been difficult to inhibit the bleed-out from the insulating layer that contains the polyolefin and that is cross-linked, while reducing the relative dielectric constant of the insulating layer.

One aspect of the present disclosure is to provide an electrical wire, a cable, and a method for manufacturing an electrical wire, wherein bleed-out from an insulating layer that contains polyolefin and that is cross-linked can be inhibited, and wherein a relative dielectric constant of the insulating layer is small.

One aspect of the present disclosure is an electrical wire comprising: a conductor; and an insulating layer that covers the conductor and that is cross-linked, wherein the insulating layer is a cross-linked product of a resin composition comprising: (a) a base polymer containing polyolefin and a compatibilizer; (b) a photoradical generator of 0.5 parts by mass or more and 3 parts by mass or less relative to 100 parts by mass of the base polymer; and (c) a reactive monomer of 1 part by mass or more and 5 parts by mass or less relative to 100 parts by mass of the base polymer, and wherein a relative dielectric constant of the insulating layer is less than 2.5.

The electrical wire according to one aspect of the present disclosure can inhibit the bleed-out from the insulating layer that contains the polyolefin and that is cross-linked. Also, the electrical wire according to one aspect of the present disclosure includes the insulating layer having a small relative dielectric constant.

Another aspect of the present disclosure is a method for manufacturing an electrical wire including a conductor and an insulating layer covering the conductor, the method comprising: forming the insulating layer by covering the conductor with a resin composition; and cross-linking the insulating layer by irradiating the insulating layer with an ultraviolet ray, wherein the resin composition comprises: (a) a base polymer containing polyolefin and a compatibilizer; (b) a photoradical generator of 0.5 parts by mass or more and 3 parts by mass or less relative to 100 parts by mass of the base polymer; and (c) a reactive monomer of 1 part by mass or more and 5 parts by mass or less relative to 100 parts by mass of the base polymer, and wherein a relative dielectric constant of the insulating layer is less than 2.5.

The electrical wire manufactured by the method according to another aspect of the present disclosure can inhibit the bleed-out from the insulating layer that contains the polyolefin and that is cross-linked. In addition, the electrical wire manufactured by the method according to another aspect of the present disclosure includes the insulating layer having a small relative dielectric constant.

BRIEF DESCRIPTION OF THE DRAWINGS

Several embodiments of the present disclosure will be described hereinafter by way of example with reference to the accompanying drawings, in which.

DETAILED DESCRIPTION OF EXEMPLARY EMBODIMENTS

Figure 1:
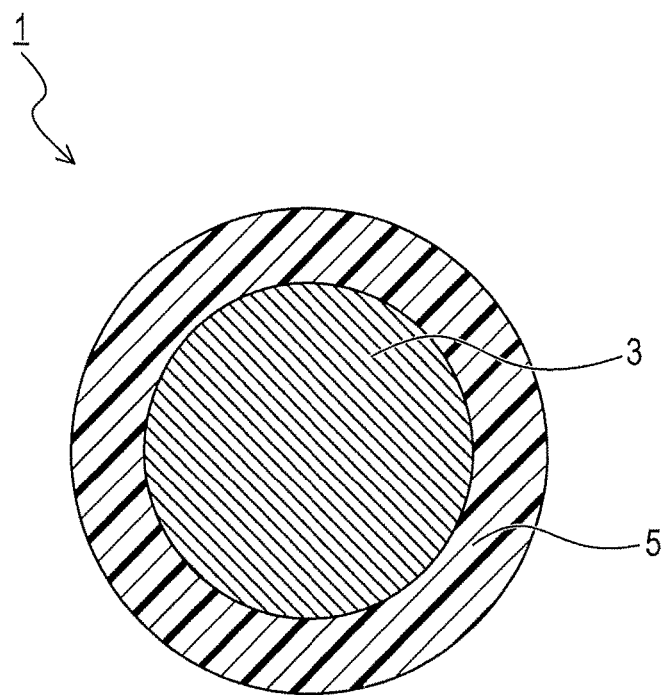
FIG. 1 is a sectional view showing a structure of an electrical wire.

1. Structure of Electrical Wire (1-1) Conductor

A conductor is not particularly limited. Examples of the conductor may include a metal conductor. Another example of the conductor may include a metal conductor covered with some sort of coating. It is preferable that the conductor has a wire diameter of 32 AWG or smaller, more preferably 34 AWG or smaller, and particularly preferably 36 AWG or smaller. In the case where a conductor having the wire diameter of 32 AWG or smaller is used, performing organic peroxide cross-linking or silane-water cross-linking on an insulating layer may cause difficulty in extrusion of the resin composition. In the case where the conductor having the wire diameter of 32 AWG or smaller is used, performing electron beam cross-linking on the insulating layer may increase a risk of breaking the wire at the time of electron beam irradiation. However, even if the conductor having the wire diameter of 32 AWG or smaller is used, ultraviolet cross-linking can be performed on the insulating layer.

(1-2) Insulating Layer

The electrical wire of the present disclosure includes an insulating layer. The insulating layer covers the conductor. The insulating layer may be formed by covering the conductor with a resin composition. The insulating layer includes polyolefin and a compatibilizer. The mixture of the polyolefin and the compatibilizer is a base polymer.

Examples of the polyolefin may include polypropylene (PP), ultra-high molecular weight polyethylene (UHMW-PE), high-density polyethylene (HDPE), linear low-density polyethylene (LLDPE), low-density polyethylene (LDPE), and very low density polyethylene (VLDPE). As the polyolefin, one type among the above may be used alone, or two or more types may be used in combination. The polyolefin may be the one in which a part of the resin is replaced with another functional group, or the one in which a part of the resin is modified by another functional group.

The compatibilizer is a resin. The compatibilizer is dissolved and finely dispersed in the polyolefin while dissolving a reactive monomer and a photoradical generator, thereby exhibiting a function to promote uniform cross-linking in the polyolefin. Also, the compatibilizer has a function to inhibit bleed-out of monomers. It is preferable that the compatibilizer has a low relative dielectric constant, which should be preferably 2.8 or less. When the compatibilizer having the low relative dielectric constant is used, the relative dielectric constant of the insulating layer can be further lowered.

Examples of the compatibilizer may include a hydrogenated styrene butadiene rubber, a styrene-ethylene butylene-olefin crystal block copolymer, an olefin crystal-ethylene butylene-olefin crystal block copolymer, and a styrene-ethylene butylene-styrene block copolymer (hereinafter, these are referred to as "specific compatibilizers"). Also, a part of ethylene-vinyl acetate copolymers may be usable as a compatibilizer if an amount, properties and use purpose thereof are suitable.

When the specific compatibilizers are used, effects described below can be further obtained.

(i) The relative dielectric constants of the specific compatibilizers are 2.4 to 2.5. When any one of the specific compatibilizers is used, the relative dielectric constant of the insulating layer can be further lowered. Also, it is possible to increase the addition amount of the specific compatibilizer while maintaining the relative dielectric constant of the insulating layer to be low. Consequently, the effect of the compatibilizer can be further enhanced.

(ii) The maximum amount of the reactive monomer dissolvable in any one of the specific compatibilizers is larger than the maximum amount of the reactive monomer dissolvable in the polyolefin. Thus, the concentrations of the reactive monomer and the photoradical generator in the specific compatibilizer are high. As a result, the cross-linking of the insulating layer can be promoted. The cross-linking is promoted also at the interface between the compatibilizer and the polyolefin.

(iii) The specific compatibilizers are excellent in dissolution and fine dispersion in the polyolefin. Thus, many starting points of cross-linking occur in the entire insulating layer. As a result, the insulating layer is likely to be a homogeneous cross-linked product.

(iv) The specific compatibilizers are excellent in the dissolution and the fine dispersion in the polyolefin. Thus, mechanical properties of the insulating layer improve. Deterioration of tensile strength and elongation due to phase separation is less likely to occur in the insulating layer.

The addition amount of the compatibilizer may be suitably set to impart desired properties to the insulating layer in accordance with, for example, properties and amounts of the reactive monomer and the photoradical generator, electrical properties of the compatibilizer, mechanical properties of the compatibilizer, and properties of the polyolefin. Specifically, the addition amount of the compatibilizer is preferably 3 parts by mass or more and 35 parts by mass or less relative to 100 parts by mass of the base polymer, and more preferably 5 parts by mass or more and 20 parts by mass or less. When the addition amount of the compatibilizer is 3 parts by mass or more, the function as the compatibilizer can be exhibited. When the addition amount of the compatibilizer is 35 parts by mass or less, it is possible to inhibit dissolving of a large amount of the reactive monomer and an initiator in the compatibilizer, which ensures the amounts of the reactive monomer and the initiator to be dissolved in the polyolefin; thus, cross-linking performance of the entire resin composition can be ensured. Examples of the electrical properties of the compatibilizer may include a relative dielectric constant and volume resistance. Examples of the mechanical properties of the compatibilizer may include elongation and tensile strength.

The addition amount of the compatibilizer is preferably equal to or more than the addition amount of the reactive monomer. When the addition amount of the compatibilizer is equal to or more than the addition amount of the reactive monomer, the bleed-out of the reactive monomer can be further inhibited.

The insulating layer includes a photoradical generator. The photoradical generator serves as a starting point of a cross-linking reaction. The photoradical generator generates a radical when irradiated with an ultraviolet ray. The generated radical grafts the resin and the reactive monomer and induces the cross-linking reaction between the grafted monomers.

The addition amount of the photoradical generator can be set in accordance with the properties of the insulating layer. The addition amount of the photoradical generator is 0.5 parts by mass or more and 3 parts by mass or less relative to 100 parts by mass of the base polymer.

When the addition amount of the photoradical generator is 0.5 parts by mass or more relative to 100 parts by mass of the base polymer, the cross-linking performance of the insulating layer improves. When the addition amount of the photoradical generator is 3 parts by mass or less relative to the 100 parts by mass of the base polymer, the mechanical properties of the insulating layer such as the elongation and the tensile strength improve. When the addition amount of the photoradical generator is 3 parts by mass or less relative to 100 parts by mass of the base polymer, it is possible to reduce the manufacturing cost of the electrical wire.

Examples of the photoradical generator may include acetophenone, 4,4'-dimethoxy benzyl, diphenylethanedione, 2-hydroxy-2-phenyl acetophenone, diphenyl ketone, benzophenone-2-carboxylic acid, 4,4'-bis(diethylamino)benzophenone, 4,4'-bis(dimethylamino)benzophenone, benzoin methyl ether, benzoin isopropyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, 2-benzoylbenzoic acid methyl, 2-(1,3-benzodioxole-5-yl)-4, 6-bis(trichloromethyl)-1,3,5-triazine, 2-benzyl-2-(dimethylamino)-4'-morpholino butyrophenone, 2,3-bornandione, 2-chlorothioxanthone, 4,4'-dichlorobenzophenone, 2,2-diethoxy acetophenone, 2,2-dimethoxy-2-phenyl acetophenone, 2,4-diethyl thioxanthene-9-one, diphenyl(2,4,6-trimethyl benzoyl)phosphine oxide, 1,4-dibenzoyl benzene, 2-ethyl anthraquinone, 1-hydroxy cyclohexyl phenyl ketone, 2-hydroxy-2-methyl propiophenone, 2-hydroxy-4'-(2-hydroxyethoxy)-2-methyl propiophenone, phenyl(2,4,6-trimethyl benzoyl)lithium phosphinate, 2-methyl-4'-(methylthio)-2-morpholino propiophenone, 2-isonitroso propiophenone, 2-phenyl-2-(p-toluenesulfonyloxy)acetophenone, and phenyl bis(2,4,6-trimethyl benzoyl)phosphine oxide. As the photoradical generator, one type among the above may be used alone, or two or more types may be used in combination.

The insulating layer includes the reactive monomer. The reactive monomer serves as a cross-linking aid. The reactive monomer is a monomer having a functional group that causes a cross-linking reaction or a polymerization reaction with, for example, a radical or a cation. Examples of the functional group, which causes the cross-linking reaction or the polymerization reaction with the radical or the cation, may include an acrylic group, a methacrylic group, a vinyl group, a vinyl ether group, an oxetane group, an epoxy group, an alicyclic epoxy group, an amino group, an allyl group, a maleic acid, and a maleic anhydride. The reactive monomer may be a monofunctional monomer or a polyfunctional monomer. As the reactive monomer, one type among the above may be used alone, or two or more types may be used in combination.

The addition amount of the reactive monomer may be set in accordance with the properties of the insulating layer. The addition amount of the reactive monomer is 1 part by mass or more and 5 parts by mass or less relative to 100 parts by mass of the base polymer.

When the addition amount of the reactive monomer is 1 part by mass or more relative to 100 parts by mass of the base polymer, the cross-linking performance of the insulating layer improves. When the addition amount of the reactive monomer is 5 parts by mass or less relative to 100 parts by mass of the base polymer, the bleed-out can be further inhibited.

The insulating layer may further include an additive, such as an ultraviolet absorber and/or a light stabilizer. The additive imparts functionality to the insulating layer. The ultraviolet absorber is not particularly limited if the ultraviolet absorber is suitable for the intended use. Examples of the ultraviolet absorber may include a salicylic acid derivative, a benzophenone-based ultraviolet absorber, a benzotriazole-based ultraviolet absorber, an oxalic anilide derivative, and 2-ethyl-hexyl-2-cyano-3,3-diphenyl-acrylate. Examples of the salicylic acid derivative may include phenyl-salicylate and p-tert-butyl phenyl-salicylate.

Examples of the benzophenone-based ultraviolet absorber may include 2,4-dihydroxy-benzophenone, 2-hydroxy-4-methoxy-benzophenone, 2,2'-dihydroxy-4-methoxy-benzophenone, 2,2' dihydroxy-4,4'-dimethoxy-benzophenone, 2-hydroxy-4-n-octoxy-benzophenone, 2,2',4,4'-tetrahydroxy-benzophenone, 4-dodecyloxy-2-hydroxy-benzophenone, 3,5-di-tert butyl-4-hydroxy benzoyl acid, n-hexadecyl ester, bis(5-benzoyl-4-hydroxy-2-methoxy phenyl)methane, 1,4-bis(4-benzoyl-3-hydroxyphenoxy)butane, and 1,6-bis(4-benzoyl-3-hydroxyphenoxy)hexane.

Examples of the benzotriazole-based ultraviolet absorber may include 2-(2'-hydroxy-5'-methyl-phenyl)benzotriazole, 2-(2'-hydroxy-3',5'-di-tert butyl-phenyl)benzotriazole, 2-(2'-hydroxy-3'-di-tert butyl-5'-methyl-phenyl)-5-chloro-benzotriazole, 2-(2'-hydroxy-3',5'-di-tert butyl-phenyl)-5-chloro-benzotriazole, 2-(2'-hydroxy-5'-tert octyl phenyl) benzotriazole, 2-(2'-hydroxy-3',5'-di-tert amylphenyl) benzotriazole, 2,2'-methylenebis [4-(1,1,3,3-tetramethyl butyl)-6-(2H-benzotriazole-2-yl)phenol], 2-[2-hydroxy-3,5-bis(α,α-dimethyl benzyl)phenyl]-2H-benzotriazole, and other benzotriazole derivatives. As the ultraviolet absorber, one type among the above may be used alone, or two or more types may be used in combination.

The light stabilizer is not particularly limited. Examples of the light stabilizer may include a hindered amine-based light stabilizer. Examples of the hindered amine-based light stabilizer may include poly[[6-(1,1,3,3-tetramethyl butyl) imino-1,3,5-triazine-2,4-diyl][(2,2,6,6-tetramethyl-4-piperidyl)imino]hexamethylene [(2,2,6,6-tetramethyl-4-piperidyl)imino]], poly[(6-morpholino-s-triazine-2,4-diyl)[2,2,6,6-tetramethyl-4-piperidyl]imino]-hexamethylene [(2,2,6,6-tetramethyl-4-piperidyl)imino]], N,N'-bis(3-aminopropyl) ethylene diamine-2,4-bis [N-butyl-N-(1,2,2,6,6-pentamethyl-4-piperidyl)amino]-6-chloro-1,3,5-triazine condensate, and dibutyl amine-1,3,5-triazine-N,N'-bis(2,2,6,6-tetramethyl-4-piperidyl-1,6-hexamethylene diamine-N-(2,2,6,6-tetramethyl-4-piperidyl)butylamine polycondenstate. As the light stabilizer, one type among the above may be used alone, or two or more types may be used in combination.

The insulating layer may further include an additive as needed, such as a process oil, a processing aid, a flame retardant aid, an antioxidant, a lubricant, an inorganic filler, a copper inhibitor, a stabilizer, and a coloring agent.

The electrical wire of the present disclosure has a structure shown in FIG. 1, for example. An electrical wire 1 includes a conductor 3 and an insulating layer 5. The insulating layer 5 covers the conductor 3. The insulating layer 5 is cross-linked. A relative dielectric constant of the insulating layer 5 is less than 2.5. It is possible to lower the relative dielectric constant of the insulating layer 5 by selecting components having small relative dielectric constants to be contained in the insulating layer.

2. Structure of Cable

A cable of the present disclosure includes at least one electrical wire and a sheath. The electrical wire is the one described in the section "1. Structure of Electrical Wire". The sheath binds the at least one electrical wire. A composition of the sheath is, for example, the above-exemplified composition of the insulating layer of the electrical wire. A thickness of the sheath is preferably 0.1 mm or more and 2.0 mm or less.

3. Method for Manufacturing Electrical Wire and Cable

The electrical wire described in the section "1. Structure of Electrical Wire" can be manufactured, for example, by the following method. First, a conductor is subjected to extrusion coating with a resin composition. The conductor is, for example, the conductor described in the section "(1-1) Conductor". The resin composition has, for example, a composition similar to the insulating layer described in the section "(1-2) Insulating Layer". As a result of the extrusion coating, an insulating layer made of the resin composition is formed. Next, for example, in a state where the temperature of the insulating layer is a melting point or higher, an ultraviolet irradiation is performed on the insulating layer. As a result, the insulating layer is cross-linked. The relative dielectric constant of the insulating layer is less than 2.5.

The ultraviolet irradiation can be performed by use of, for example, a metal halide lamp or an ultraviolet light emitting diode (LED). It is preferable that the ultraviolet irradiation is performed by use of several kinds of ultraviolet LEDs having different emission wavelengths. In this case, even if an ultraviolet ray having a specific wavelength is absorbed and/or blocked by the resin or the additive, the cross-linking progresses with ultraviolet rays having other wavelengths; thus, it is easy to obtain products having stable degrees of cross-linking.

It is preferable that the ultraviolet ray emitted from the ultraviolet LED has a peak in a wavelength close to a wavelength to which the photoradical generator is reactive (such wavelength will be referred to as "reactive wavelength", hereafter). Examples of the wavelength close to the reactive wavelength of the photoradical generator may include 405 nm, 395 nm, 385 nm, 365 nm, 300 nm, and 285 nm. For example, a first ultraviolet LED and a second ultraviolet LED may be used in combination. The ultraviolet ray emitted from the first ultraviolet LED has a peak in a first wavelength close to the reactive wavelength of the photoradical generator. The ultraviolet ray emitted from the second ultraviolet LED has a peak in a wavelength that is close to the reactive wavelength of the photoradical generator and that is different from the first wavelength.

It is also possible, for example, to use an ultraviolet LED that emits an ultraviolet ray having a peak in a wavelength different from the reactive wavelength of the photoradical generator.

A metal halide lamp is also called a discharge tube. The metal halide lamp may be with or without electrodes. A peak wavelength of the metal halide lamp during emission is preferably a wavelength suitable for the photoradical generator. The metal halide lamp may be configured such that a specific chemical element is sealed between the electrodes to adjust the emission wavelength.

After the extrusion coating, the insulating layer is preferably heated. The heating may be carried out at least before or after the ultraviolet irradiation. Heating the insulating layer promotes the cross-linking of the insulating layer.

Figure 2:
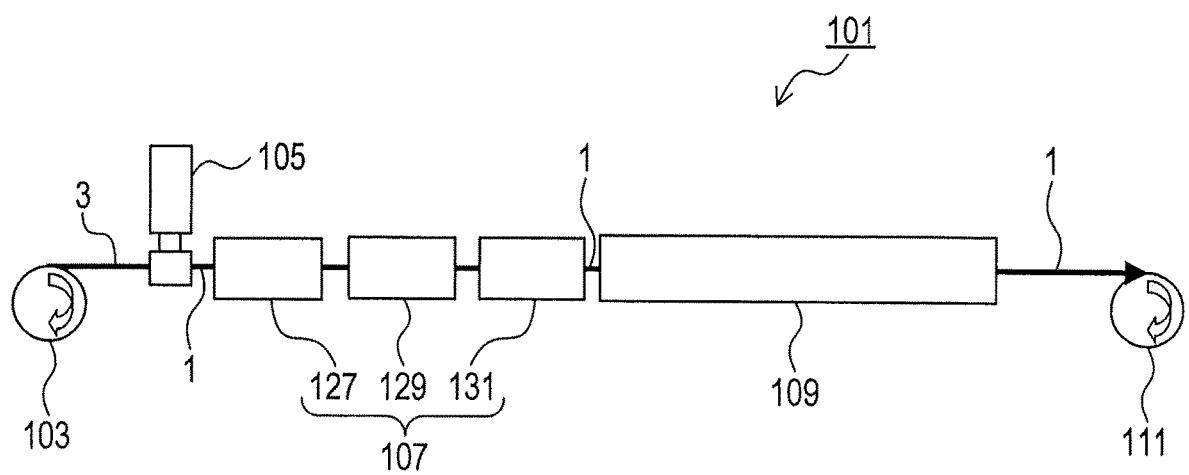
FIG. 2 is an explanatory diagram showing a structure of a manufacturing apparatus of the electrical wire.
Figure 3:
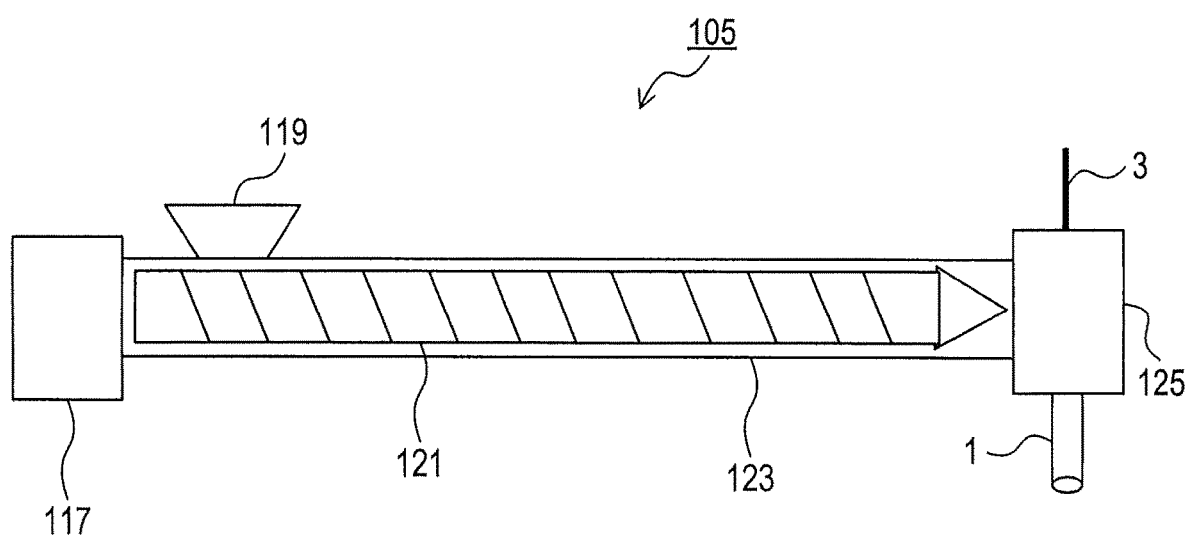
FIG. 3 is an explanatory diagram showing a structure of a molding device.

The above-described method for manufacturing the electrical wire can be carried out using, for example, a manufacturing apparatus 101 shown in FIG. 2 and FIG. 3. As shown in FIG. 2, the manufacturing apparatus 101 includes a feeder 103, a molding device 105, a cross-linking device 107, a cooling device 109, and a reel device 111.

The feeder 103 is configured to feed the conductor 3. The molding device 105 is configured to perform the extrusion coating on the conductor 3 fed out from the feeder 103 with the resin composition. Accordingly, the electrical wire 1 including the conductor 3 and insulating layer is formed.

The molding device 105 is an extruder. As shown in FIG. 3, the molding device 105 includes a driving device 117, a resin input aperture 119, a screw 121, a cylinder 123, and a molding head 125. The driving device 117 is configured to rotationally drive the screw 121. The resin composition is introduced into the cylinder 123 from the resin input aperture 119. The introduced resin composition advances inside the cylinder 123 while melted and kneaded by the rotating screw 121, and the resin composition is extruded from the molding head 125 to cover the conductor 3.

For example, respective components of the resin composition may be separately introduced into the resin input aperture 119. Alternatively, for example, the components of the resin composition may be kneaded by a mixer, a blender, a roller or the like and pelletized in advance and the resultant may be introduced into the resin input aperture 119.

The cross-linking device 107 is configured to cross-link the insulating layer made of the resin composition. The cross-linking device 107 includes a first heater 127, an ultraviolet irradiation device 129, and a second heater 131. An arbitrary part of the electrical wire 1 is first heated by the first heater 127, and then, irradiated with the ultraviolet rays in the ultraviolet irradiation device 129, and finally, heated by the second heater 131.

The first heater 127 is configured to increase the temperature of the insulating layer to temperature at which the ultraviolet cross-linking is likely to occur. The second heater 131 is configured to maintain the temperature of the insulating layer so that the ultraviolet cross-linking continues even after the arbitrary portion passes through the ultraviolet irradiation device 129.

The ultraviolet irradiation device 129 includes, for example, a metal halide lamp or an ultraviolet LED. The ultraviolet irradiation device 129 includes, for example, various types of ultraviolet LEDs having different emission wavelengths. The cooling device 109 is configured to cool the electrical wire 1 after the cross-linking to harden the insulating layer. The reel device 111 is configured to wind the cooled electrical wire 1. The cooling device 109 is, for example, a water-cooled type cooling device or an air-cooled type cooling device. If there is no problem in manufacturing, it is not necessary to provide the manufacturing apparatus 101 with the first heater 127, the second heater 131, or the cooling device 109.

The cable of the present disclosure can be manufactured, for example, by binding the at least one electrical wire, which is manufactured by the above method, with the sheath in accordance with a known method.

4. Effects Achieved by Cable, Electrical Wire, and Method for Manufacturing Electrical Wire The electrical wire and the cable of the present disclosure can inhibit the bleed-out from the insulating layer that contains the polyolefin and that is cross-linked. In addition, the electrical wire and the cable of the present disclosure include the insulating layer having the small relative dielectric constant. The electrical wire, which is manufactured by the method for manufacturing the electrical wire of the present disclosure, can inhibit the bleed-out from the insulating layer that contains the polyolefin and that is cross-linked. Also, the electrical wire, which is manufactured by the method for manufacturing the electrical wire of the present disclosure, includes the insulating layer having the small relative dielectric constant.

5. Embodiments (5-1) Manufacturing Electrical Wire

The raw materials of the resin composition listed in the row of "Formulation of Resin Composition" in Table 1 were mixed and kneaded by a kneader. As a result, pelletized resin compositions of Embodiments 1 to 5 and Comparative Examples 1 to 4 were obtained.

TABLE 1

|  |  |  | B1 | B2 | B3 | A1 | A2 | A3 | A4 | A5 | B4 |
|---|---|---|---|---|---|---|---|---|---|---|---|
| Formulation of Resin Composition | Base Polymer | B028 | 100 | 100 | 80 | 80 |  |  | 70 | 65 | 65 |
|  |  | 0434N |  |  |  |  | 80 |  |  |  |  |
|  |  | Hizex5305E |  |  |  |  |  | 80 |  |  |  |
|  |  | DYNARON 6200P | 0 | 0 | 20 | 20 | 20 | 20 | 30 | 35 | 35 |
|  | Reactive Monomer | TAIC | 0.8 | 3 | 3 | 3 | 3 | 3 | 4 | 5 | 7 |
|  | Photoradical Generator | Irg-TPO | 0.3 | 2 | 2 | 2 | 2 | 2 | 2 | 3 | 5 |
| UV Irradiation |  | Y/N | Y | Y | N | Y | Y | Y | Y | Y | Y |
| Results | Bleed Occurrence (30 Days after Manufacturing Electrical Wire) |  | N | Y | N | N | N | N | N | N | Y |
|  | Degree of Crosslinking (Xylene Extraction at 110° C. for 24 h) |  | 5 | 65 | 0 | 70 | 60 | 55 | 75 | 75 | 75 |
|  | Heat Deformation Test (Thickness of 1 mm, 120° C., 50%) |  | X | ○ | X | ○ | ○ | ○ | ○ | ○ | ○ |
|  | Relative Dielectric Constant: Sheet Test |  | 2.32 | 2.36 | 2.42 | 2.41 | 2.38 | 2.44 | 2.46 | 2.46 | 2.47 |

In Table 1, the amounts to formulate the resin composition are indicated by parts by mass. In Table 1, "A1" to "A5" respectively mean Embodiment 1 to Embodiment 5. In Table 1, "B 1" to "B4" respectively mean Comparative Example 1 to Comparative Example 4. The raw materials listed in Table 1 are explained below.

B028: low-density polyethylene (manufactured by Ube-Maruzen Polyethylene Co., Ltd., MFR 0.4 at 190° C.)

0434N: linear low-density polyethylene (LLDPE) (manufactured by Prime Polymer Co., Ltd., MFR 4.0 at 190° C.))

Hizex5305E: high-density polyethylene (HDPE) (manufactured by Prime Polymer Co., Ltd., MFR 0.8 at 190° C.)

DYNARON6200P: olefin crystal-ethylene butylene-olefin crystal block copolymer (manufactured by JSR Corporation, MFR 2.5 at 230° C., 21.2 N)

TAIL: a reactive monomer (triallyl isocyanurate)

Irg-TPO: a photoradical generator (manufactured by BASF, 2,4,6-trimethyl benzoyl-diphenyl-phosphine oxide)

MFR stands for a mass flow rate. The MFR is measured in accordance with the method specified by Japanese industrial standards (JIS) K 7120. In addition, the MFRs of the polyethylene are measured in accordance with standard conditions specified by JIS K 6922, that is, at a temperature of 190° C. and under a load of 21.2 N (2.16 kgf). The MFR of DYNARON6200P is measured at a temperature of 230° C. and under a load of 21.2 N (2.16 kgf). The relative dielectric constant of DYNARON6200P is 2.35. B028, 0434N, and Hizex5305E correspond to the polyolefin. DYNARON6200P corresponds to the compatibilizer. B028, 0434N, Hizex5305E, and DYNARON6200P correspond to the base polymer.

By using the resin compositions of Embodiments and Comparative Examples, electrical wires were manufactured by the following method. First, the resin composition was introduced into the resin input aperture 119 in the manufacturing apparatus 101 shown in FIG. 2 and FIG. 3. Then, a copper conductor fed out from the feeder 103 was subject to the extrusion coating with the resin composition, whereby an electrical wire was formed. The wire diameter of the copper conductor was 36 AWG. The 36 AWG copper conductor was formed by twisting seven element wires each having a diameter of 0.05 mm. The outer diameter of the electrical wire was 0.52 to 0.56 mm.

Then, the insulating layer of the electrical wire was cross-linked through the cross-linking device 107, the electrical wire was cooled through the cooling device 109, and the electrical wire was wound up by the reel device 111. Only in Comparative Example 3, the ultraviolet irradiation device 129 did not perform the ultraviolet irradiation. In Table 1, "Y" indicates that the ultraviolet irradiation was performed, and "N" indicates that the ultraviolet irradiation was not performed.

The copper conductor corresponds to the conductor. A 20 mm single-shaft extruder (L/D=25) manufactured by Omiya Seiki Co., Ltd. was used as the molding device 105. A temperature and a linear velocity during the extrusion were constant. The extrusion speed was 30 mm/min.

The ultraviolet irradiation device 129 was provided with two metal halide lamps. The two metal halide lamps were both high pressure metal halide lamps (6 kW lamp in SMX series) manufactured by Ore Manufacturing Co., Ltd. One of the two metal halide lamps emitted an ultraviolet ray to the electrical wire from above, and the other emitted an ultraviolet ray to the electrical wire from below.

(5-2) Evaluation Method of Electrical Wire (i) Observation of Bleed-Out

After the electrical wires of Embodiments and Comparative Examples were manufactured, they were left at room temperature for 30 days. Then, the surface of each electrical wire was visually observed, and the presence or absence of the bleed-out was checked. In Table 1, "Y" indicates that the bleed-out was observed, and "N" indicates that the bleed-out was not observed.

(ii) Measurement of Degree of Cross-Linking

The degrees of cross-linking of the insulating layers of Embodiments and Comparative Examples were measured in accordance with a xylene extraction method specified in JIS C 3005. In the xylene extraction, the extraction condition was 24-hour extraction at a temperature of 110° C. Table 1 shows measurement results of the degree of cross-linking.

(iii) Heat Deformation Test

To evaluate deformation and fluidity of the resin composition at the time of heating, a heat deformation test was performed by the method below. A compound formulated by the same composition as the resin composition of each of Embodiments and Comparative Examples was subjected to roller kneading and press molding, whereby a sheet having a thickness of 2 mm was formed.

Next, an ultraviolet irradiation of 2 J/cm² was performed on the formed sheet by use of a conveyor type irradiation device. The conveyor type irradiation device was equipped with a metal halide lamp manufactured by Orc Manufacturing Co., Ltd. Then, a test piece having specified width and length was cut out from the sheet.

Next, a heat deformation test was performed on the cut-out test pieces. The heat deformation test was conducted at a temperature of 120° C. in accordance with JIS: C3005. The acceptability criterion was a deformation rate of less than 50%. The evaluation results are shown in Table 1. In Table 1, "O" means "passed" and "X" means "failed". It was confirmed that each test piece had the degree of cross-linking similar to that of the insulating layer of the corresponding one of Embodiments or Comparative Examples.

(iv) Measurement of Relative Dielectric Constant

Test pieces were prepared by a method similar to the method used in the heat deformation test. However, the thickness of each test piece was 1 mm. Then, the capacitance of each test piece was measured under a condition of an electrode diameter of 76 mm by use of an insulation material C&Tan δ measurement device (DAC-IM-D6) manufactured by Soken Electric Co., Ltd. Next, the relative dielectric constant of each test piece was calculated from the capacitance. The measurement results are shown in Table 1. It was confirmed that each test piece had the degree of cross-linking similar to that of the insulating layer of the corresponding one of Embodiments or Comparative Examples.

(5-3) Evaluation Results of Electrical Wire

In Embodiments 1 to 5, the bleed-out did not occur. Embodiments 1 to 5 exhibited high degrees of cross-linking. The evaluation results of the heat deformation of Embodiments 1 to 5 were that they passed the test. In Embodiments 1 to 5, the relative dielectric constants of the insulating layer were less than 2.5.

Embodiments 2 and 3 contained olefin different from that of Embodiment 1. In Embodiments 4 and 5, the addition amount of the olefin was smaller than that of Embodiment 1, and the addition amounts of the compatibilizer, the reactive monomer, and the photoradical generator were larger than those of Embodiment 1. Embodiments 4 and 5 showed higher degrees of cross-linking than Embodiment 1; but the increases of the degrees of cross-linking were relatively small.

As seen from Embodiments 1 to 5, the relative dielectric constant of the insulating layer could be reduced and the bleed-out from the insulating layer could be inhibited by adding the specific compatibilizer to the base polymer and by adding suitable amounts of the reactive monomer and the photoradical generator to the resin composition.

Comparative Example 1 is different from Embodiment 1 in that the compatibilizer was not added and the addition amounts of the reactive monomer and the photoradical generator were small. In Comparative Example 1, the bleed-out was not observed. However, the degree of cross-linking was low in Comparative Example 1 even though the ultraviolet irradiation was performed. In Comparative Example 1, the deformation and the fluidization of the insulating layer could not be inhibited, and the evaluation result of the heat deformation was that it failed the test.

Comparative Example 2 is different from Embodiment 1 in that the compatibilizer was not added. Comparative Example 2 contained the amounts of the reactive monomer and the photoradical generator enough to progress sufficient cross-linking. The evaluation result of the heat deformation test of Comparative Example 2 was that it passed the test. However, in Comparative Example 2, the bleed-out occurred.

Comparative Example 3 is different from Embodiment 1 in that the ultraviolet irradiation was not performed. In Comparative Example 3, the bleed-out was not observed. In Comparative Example 3, the degree of cross-linking was low, and thus, the evaluation result of the heat deformation was that it failed the test.

Comparative Example 4 is different from Embodiment 5 in that the addition amounts of the reactive monomer and the photoradical generator were further increased. In Comparative Example 4, the degree of cross-linking was almost the same as that of Embodiment 5. However, in Comparative Example 4, the bleed-out occurred.

6. Other Embodiments

The embodiments of the present disclosure are described hereinbefore. Nevertheless, the present disclosure is not limited to the above-described embodiments but may be embodied in various modified forms.

(1) Functions of one component in the aforementioned embodiments may be achieved by two or more components; one function of one component may be achieved by two or more components. Functions of two or more components may be achieved by one component; one function of two or more components may be achieved by one component. A part of the structures of the aforementioned embodiments may be omitted. At least a part of the structures of the aforementioned embodiments may be added to or replaced with other structures of another embodiment described above.

(2) In addition to the above-described electrical wire and cable, the present disclosure may be embodied in various forms, such as a system comprising any one of the above-described electrical wire and cable as a component, a method for manufacturing a cable, and a method for cross-linking an insulation layer.

What is claimed is:

1. An electrical wire comprising:
a conductor; and
an insulating layer that covers the conductor and that is cross-linked,
wherein the insulating layer constitutes an outermost layer of the electrical wire,
wherein the insulating layer is a cross-linked product of a resin composition comprising:
(a) a base polymer containing polyolefin and a compatibilizer;
(b) a photoradical generator of 0.5 parts by mass or more and 3 parts by mass or less relative to 100 parts by mass of the base polymer; and
(c) a reactive monomer of 1 part by mass or more and 5 parts by mass or less relative to 100 parts by mass of the base polymer, and
wherein a relative dielectric constant of the insulating layer is less than 2.5.

2. The electrical wire according claim 1,
wherein the polyolefin is one or more selected from the group consisting of polypropylene, ultra high molecular weight polyethylene, high-density polyethylene, linear low-density polyethylene, low-density polyethylene, and very low density polyethylene.

3. The electrical wire according claim 1,
wherein a relative dielectric constant of the compatibilizer is 2.8 or less.

4. The electrical wire according claim 1,
wherein the compatibilizer is one or more selected from the group consisting of a hydrogenated styrene butadiene rubber, a styrene-ethylene butylene-olefin crystal block copolymer, an olefin crystal-ethylene butylene-olefin crystal block copolymer, and a styrene-ethylene butylene-styrene block copolymer.

5. A cable comprising:
at least one electrical wire according to claim 1; and
a sheath binding the electrical wire.

6. A method for manufacturing an electrical wire including a conductor and an insulating layer covering the conductor, the method comprising:
forming the insulating layer by covering the conductor with a resin composition, the insulating layer constituting an outermost layer of the electrical wire; and
cross-linking the insulating layer by irradiating the insulating layer with an ultraviolet ray,
wherein the resin composition comprises:
(a) a base polymer containing polyolefin and a compatibilizer;
(b) a photoradical generator of 0.5 parts by mass or more and 3 parts by mass or less relative to 100 parts by mass of the base polymer; and
(c) a reactive monomer of 1 part by mass or more and 5 parts by mass or less relative to 100 parts by mass of the base polymer, and
wherein a relative dielectric constant of the insulating layer is less than 2.5.

7. The method for manufacturing the electrical wire according to claim 6,
wherein the polyolefin is one or more selected from the group consisting of polypropylene, ultra high molecular weight polyethylene, high-density polyethylene, linear low-density polyethylene, low-density polyethylene, and very low density polyethylene.

8. The method for manufacturing the electrical wire according to claim 6,
wherein a relative dielectric constant of the compatibilizer is 2.8 or less.

9. The method for manufacturing the electrical wire according to claim 6,
wherein the compatibilizer is one or more selected from the group consisting of a hydrogenated styrene butadiene rubber, a styrene-ethylene butylene-olefin crystal block copolymer, an olefin crystal-ethylene butylene-olefin crystal block copolymer, and a styrene-ethylene butylene-styrene block copolymer.

10. The electrical wire according to claim 1, wherein an addition amount of the compatibilizer is equal to or more than an addition amount of the reactive monomer.

11. The electrical wire according to claim 10, wherein an addition amount of the photoradical generator is 2 parts by mass or more and 3 parts by mass or less relative to 100 parts by mass of the base polymer, the addition amount of the reactive monomer is 3 parts by mass or more and 5 parts by mass or less relative to 100 parts by mass of the base polymer, and the addition amount of the compatibilizer is 3 parts by mass or more and 35 parts by mass or less relative to 100 parts by mass of the base polymer.

12. The method according to claim 6, wherein an addition amount of the compatibilizer is equal to or more than an addition amount of the reactive monomer.

13. The method according to claim 12, wherein an addition amount of the photoradical generator is 2 parts by mass or more and 3 parts by mass or less relative to 100 parts by mass of the base polymer, the addition amount of the reactive monomer is 3 parts by mass or more and 5 parts by mass or less relative to 100 parts by mass of the base polymer, and the addition amount of the compatibilizer is 3 parts by mass or more and 35 parts by mass or less relative to 100 parts by mass of the base polymer.

\* \* \* \* \*